United States Patent
Anderson et al.

(10) Patent No.: US 10,341,115 B2
(45) Date of Patent: Jul. 2, 2019

(54) DATA SECURITY SYSTEM THAT USES A REPEATABLE MAGNETIC SIGNATURE AS A WEAK ENTROPY SOURCE

(71) Applicant: Seagate Technology LLC, Cupertino, CA (US)

(72) Inventors: William Erik Anderson, Longmont, CO (US); Jiangnan Lin, Singapore (SG); Xiong Liu, Singapore (SG); Quan Li, Singapore (SG)

(73) Assignee: Seagate Technology LLC, Cupertino, CA (US)

(*) Notice: Subject to any disclaimer, the term of this patent is extended or adjusted under 35 U.S.C. 154(b) by 287 days.

(21) Appl. No.: 15/248,738

(22) Filed: Aug. 26, 2016

(65) Prior Publication Data

US 2018/0062850 A1 Mar. 1, 2018

(51) Int. Cl.
| | |
|---|---|
| *H04L 29/06* | (2006.01) |
| *H04L 9/32* | (2006.01) |
| *G06F 3/06* | (2006.01) |
| *G06F 21/00* | (2013.01) |
| *G11B 20/00* | (2006.01) |
| *G11B 19/02* | (2006.01) |

(52) U.S. Cl.
CPC ............ *H04L 9/3247* (2013.01); *G06F 3/064* (2013.01); *G06F 3/0623* (2013.01); *G06F 3/0676* (2013.01); *G06F 21/00* (2013.01); *G11B 19/02* (2013.01); *G11B 20/00086* (2013.01); *G11B 20/00123* (2013.01)

(58) Field of Classification Search
CPC ... H04L 9/3247; G06F 3/0623; G06F 3/0676; G06F 3/064; G11B 33/122; G11B 33/022
See application file for complete search history.

(56) References Cited

U.S. PATENT DOCUMENTS

| | | | |
|---|---|---|---|
| 5,365,586 A * | 11/1994 | Indeck | G06F 21/10 |
| | | | 235/380 |
| 6,700,732 B1 * | 3/2004 | Indeck | B25J 9/1697 |
| | | | 360/110 |
| 7,330,328 B2 | 2/2008 | Xie et al. | |
| 7,757,953 B2 | 7/2010 | Hart et al. | |
| 8,015,224 B1 * | 9/2011 | Chaichanavong | H04L 9/0861 |
| | | | 708/254 |
| 8,209,540 B2 | 6/2012 | Brouwer et al. | |
| 8,280,052 B2 | 10/2012 | Chen et al. | |
| 8,495,118 B2 | 7/2013 | Wang et al. | |
| 8,893,264 B2 | 11/2014 | Suominen | |
| 9,037,624 B1 | 5/2015 | Hars et al. | |

(Continued)

*Primary Examiner* — Harunur Rashid
(74) *Attorney, Agent, or Firm* — Hall Estill Attorneys at Law (57) ABSTRACT

Apparatus and method for data security in a data storage device. In some embodiments, an alternating pattern is written to a magnetic recording medium as a sequence of symbols at a selected clock rate. A repeatable magnetic signature is generated by reading the alternating pattern from the medium, the magnetic signature having relatively weak entropy at boundaries of the symbols. A multi-bit digital sequence is extracted from the repeatable magnetic signature, the digital sequence having relatively strong entropy. The digital sequence is stored in a separate memory coupled to the medium. Access to data stored on the medium is authenticated responsive to the digital sequence stored in the separate memory.

13 Claims, 7 Drawing Sheets

(56) References Cited

U.S. PATENT DOCUMENTS

| | | | |
|---|---|---|---|
| 2006/0291649 A1* | 12/2006 | Crandall | H04L 9/001 380/46 |
| 2007/0152854 A1 | 7/2007 | Copley | |
| 2008/0304389 A1* | 12/2008 | Den Hollander | G11B 19/122 369/59.1 |
| 2010/0177891 A1* | 7/2010 | Keidar | H04N 5/913 380/200 |
| 2011/0035808 A1* | 2/2011 | Butler | G06F 21/575 726/27 |
| 2011/0302420 A1* | 12/2011 | Davida | G06F 21/32 713/180 |
| 2014/0059555 A1 | 2/2014 | Bacher et al. | |
| 2014/0343703 A1 | 11/2014 | Topchy et al. | |
| 2015/0268934 A1 | 9/2015 | Anderson et al. | |
| 2015/0301803 A1 | 10/2015 | Boenisch et al. | |

* cited by examiner

DATA SECURITY SYSTEM THAT USES A REPEATABLE MAGNETIC SIGNATURE AS A WEAK ENTROPY SOURCE

SUMMARY

Various embodiments of the present disclosure are generally directed to an apparatus and method for data security in a data storage device.

In some embodiments, an alternating pattern as a sequence of symbols is written to a magnetic recording medium. A repeatable magnetic signature is generated by reading the alternating pattern from the medium, the magnetic signature having relatively weak entropy at boundaries of the symbols. A multi-bit digital sequence is extracted from the repeatable magnetic signature, the digital sequence having relatively strong entropy. The digital sequence is stored in a separate memory coupled to the medium. Access to data stored on the medium is authenticated responsive to the digital sequence stored in the separate memory.

In other embodiments, a data storage device has a housing which encloses a rotatable magnetic recording medium adjacent a moveable read/write transducer and a control circuit which directs the transducer to write an alternating magnetic pattern to a selected location on the medium as a sequence of symbols and to subsequently read the alternating pattern to form a repeatable magnetic signature having relatively weak entropy at boundaries of the symbols. An extraction circuit is configured to extract a multi-bit digital sequence having relatively strong entropy responsive to the repeatable magnetic signature. A control circuit is physically connected to the data storage device. The control circuit is configured to store the digital signature in a separate memory, and configured to subsequently authenticate access to data stored on the medium responsive to the digital sequence stored in the separate memory.

These and other features which characterize various embodiments of the present disclosure can be understood in view of the following detailed discussion and the accompanying drawings.

DETAILED DESCRIPTION

Data security schemes are used to reduce or eliminate unwanted access to data by unauthorized users of digital data storage systems. Data security schemes can employ a variety of cryptographic security techniques, such as data encryption and other data security protocols.

Data encryption generally involves the transformation of an input data sequence (plaintext) to an encrypted output data sequence (ciphertext) using a selected encryption algorithm (cipher). The cipher may utilize one or more pieces of auxiliary data (keys) to effect the transformation. In this context, plaintext can include data that have been previously encrypted by an upstream encryption process.

Data security protocols more generally deal with maintaining the security of data within a system, such as by establishing symmetric keys, carrying out secret sharing transactions, establishing and verifying connections, authenticating data, etc.

Some data security schemes operate to ensure various system components remain physically interconnected (mated) in a cooperative arrangement in order to allow access to data stored by the system. The various system components can take a variety of forms such as data storage devices, controller boards, integrated circuit (IC) chip sets, memory modules, storage servers, etc. By ensuring that these and other forms of components are physically present in a system, attacks that involve swapping out various components in an effort to emulate a given system and gain access to the data stored thereby may be thwarted.

Various embodiments of the present disclosure are accordingly directed to a method and apparatus for implementing a security scheme in a data storage system. As explained below, some embodiments generally involve writing an alternating pattern as a sequence of symbols to a magnetic recording medium. The medium may have a recording layer with a plurality of irregularly shaped magnetic grains. A repeatable magnetic signature is generated at boundaries of the symbols during a read operation, with the repeatable magnetic signature utilized as a source of weak entropy.

The source of weak entropy is applied to an extraction circuit to generate a random sequence which serves as a unique digital multi-bit signature (fingerprint) for the recording medium. The digital signature will have relatively strong amounts of entropy. The fingerprint is stored in a separate memory and utilized during subsequent data authentication and authorization operations.

In some embodiments, the fingerprint can be used as a seed, encryption key or other value in a cryptographic process that encrypts or otherwise encodes user data stored by the recording medium. In other embodiments, the fingerprint is used in a hardware authentication process in which a subsequent fingerprint is extracted from the medium and compared to the previously stored fingerprint, to ensure the medium remains physically coupled to the associated hardware.

Figure 1:
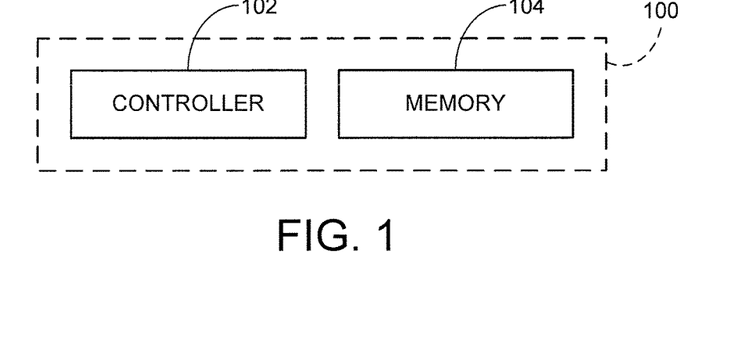
FIG. 1 is a functional block representation of a data storage system which operates in accordance with various embodiments of the present disclosure.

These and other aspects of various embodiments can be understood beginning with a review of FIG. 1 which provides an exemplary data storage device 100. The data storage device 100 includes a controller 102 and a memory module 104. The controller 102 is a controller circuit that includes a hardware-based or programmable processor that provides top level control of the device 100. The memory module 104 comprises non-volatile memory (media) and associated control circuitry to enable data transfers, under the direction of the controller, between the media and a host device responsive to various storage (read/write) requests. In some embodiments, the controller functionality may be incorporated directly into the memory module 104.

Figure 2:
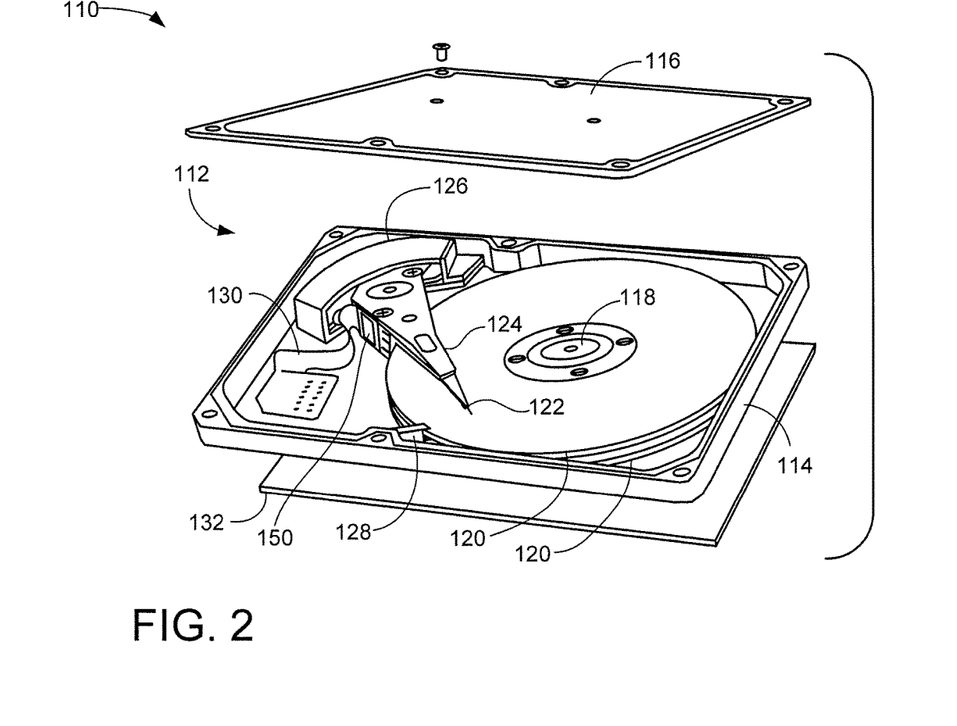
FIG. 2 shows the data storage device of FIG. 1 in an embodiment in which the data storage device is characterized as a hard disc drive (HDD).

FIG. 2 shows a depiction of the data storage device 100 of FIG. 1 as a hard disc drive (HDD) 110. Other storage device configurations can be utilized as desired, including hybrid data storage devices (HDSDs or HSSDs) that utilize both rotatable media and solid-state media (e.g., flash, etc.) to store user data.

The HDD 110 includes an environmentally sealed housing 112 formed by mating engagement of a base deck 114 and a top cover 116. Disposed within the housing 112 is a spindle motor 118 adapted to rotate one or more magnetic recording media (discs) 120 at a constant high speed. Two axially aligned discs 120 are shown in FIG. 2, although other numbers of discs can be used. Each disc may have two opposing data recording surfaces defined thereon to store user data.

An array of data read/write transducers (heads) 122 are arranged to access the various recording surfaces. The heads 122 are supported by a rotatable actuator 124 and controllably moved radially across the disc surfaces using a voice coil motor (VCM) 126. The heads 122 are aerodynamically supported adjacent the disc surfaces using atmospheric currents established by high speed rotation of the discs 120, so that the heads fly at respectively controlled fly heights adjacent the disc surfaces. A ramp load/unload structure 128 provides a mechanism to safely support the heads 122 in an offloaded position when the discs are in a deactivated (nonrotational) condition.

A flex circuit 130 provides communication paths between the heads 122 and the VCM 126 within the housing 102 to an externally mounted printed circuit board assembly (PCBA) 132. The PCBA 132 supports various control circuitry utilized by the HDD 110 during operation. For reference, those aspects of the HDD 110 apart from the PCBA 132 are sometimes referred to as a head-disc assembly (HDA). Attachment of the PCBA 132 to the HDA completes the HDD.

Figure 3:
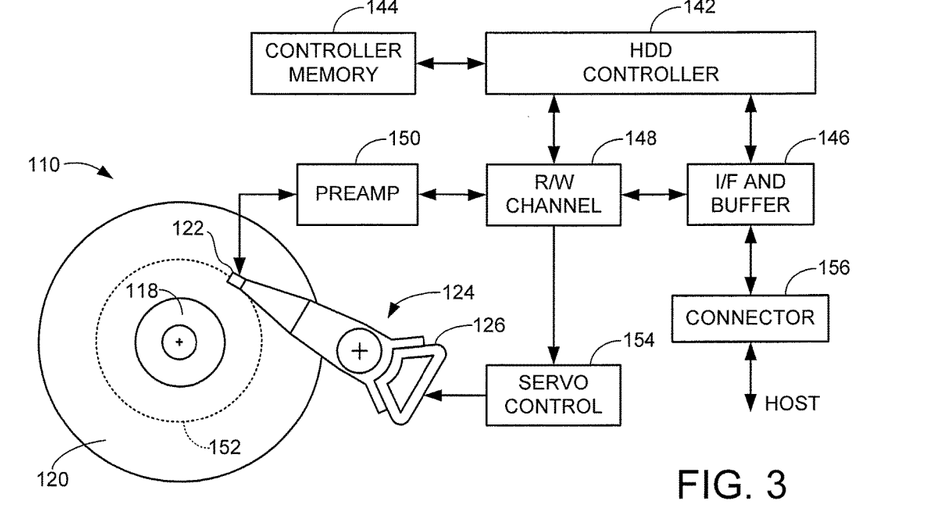
FIG. 3 is a functional block representation of the HDD of FIG. 2.

FIG. 3 is a functional block representation of at least some of the control electronics supported by the PCBA 132 from FIG. 2. Other arrangements can be used. A top level HDD controller 142 generally corresponds to the controller 102 of FIG. 1. An interface (I/F) and buffer circuit 146 enables communication of data, commands and status with a host device via a suitable interface (e.g., SATA, SAS, Fibre-Channel, Ethernet, etc.). The circuit 146 includes a buffer memory adapted to temporarily store user data during storage request processing.

A read/write (R/W) channel 148 conditions the data during read and write operations. A preamplifier/driver circuit (preamp) 150 provides write currents to a write element of each head 122 during write operations and provides signal conditioning and amplification of readback signals from a read sensor of each head 122 during read operations. In some cases, the preamp 150 may be mounted to a side of the actuator 124, as generally depicted in FIG. 2. Data are written to and read from various concentric tracks defined on the recording surfaces. One exemplary track is denoted at 152.

A closed loop servo control circuit 154 provides servo positional control for the respective heads 122 using demodulated servo control data that are transduced from embedded servo fields defined on the respective recording surfaces.

A connector 156 serves to physically interconnect the data storage device 110 to a separate host device. The connector may take the form of a multi-pin electrical connector with a selected pin layout. The electrical connector may be adapted to the host interface protocol employed by the device, or may take some other form. As explained below, some embodiments of the disclosure ensure that the data storage device 110 (or portions thereof, such as the HDA) are physically connected to the host device (or other system component) by way of the connector 156, as opposed to a counterfeit operation in which one or the other device is spoofed using an emulation technique to appear that the other component remains physically coupled to the media 120.

In some cases, the data storage device 110 may be operated in a stand-alone fashion as a main memory for a local host device, such as a personal computer, laptop, workstation, gaming console, etc. In other cases, the device 110 may be incorporated into a larger, multi-device storage system, such as the system 160 represented in FIG. 4.

Figure 4:
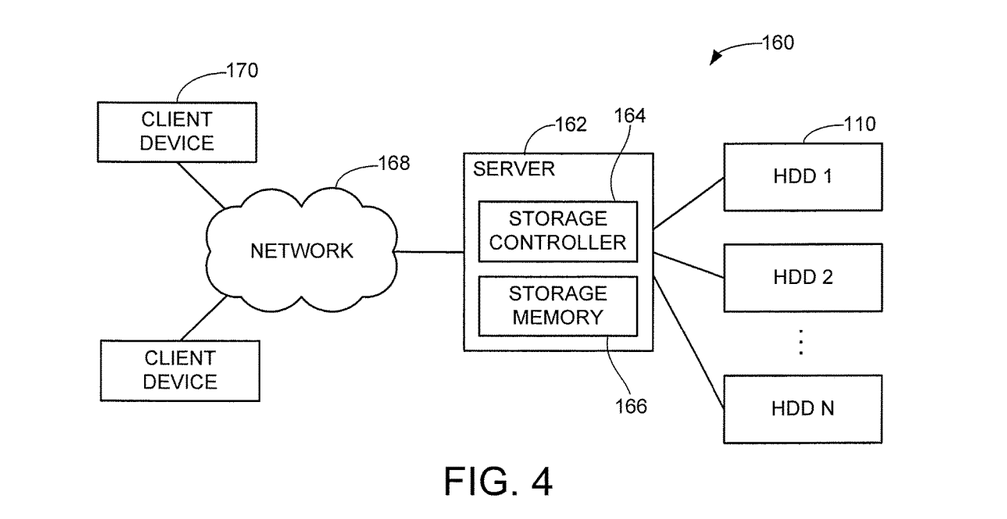
FIG. 4 shows a network configuration involving the use of multiple HDDs as set forth in FIGS. 2-3 to provide a combined memory space.

As shown in FIG. 4, a plurality N of the HDDs 110 are arranged to provide a combined memory space for a distributed data storage system. A storage server 162 operates to direct data storage to the respective devices, such as in a RAID (redundant array of independent discs) and/or a cloud computing environment. The server 162 includes a storage controller 164 and storage memory 166. The storage controller 164 may be similar to the controllers discussed above and may be hardware-based or programmable processor based circuits. The storage memory 166 provides a local buffer for data transfers and may be volatile or non-volatile memory.

A network 168 allows remote client (host) devices 170 to transfer storage requests to the server 162 to store and retrieve data to/from the HDDs 110. The network 168 can take any variety of forms, including a local area network (LAN), wide area network (WAN), a wireless network, the Internet, etc. The client devices 170 can take any suitable form of network accessible devices including but not limited to computers, laptops, tablets, gaming consoles, smart phones, etc.

Figure 5A:
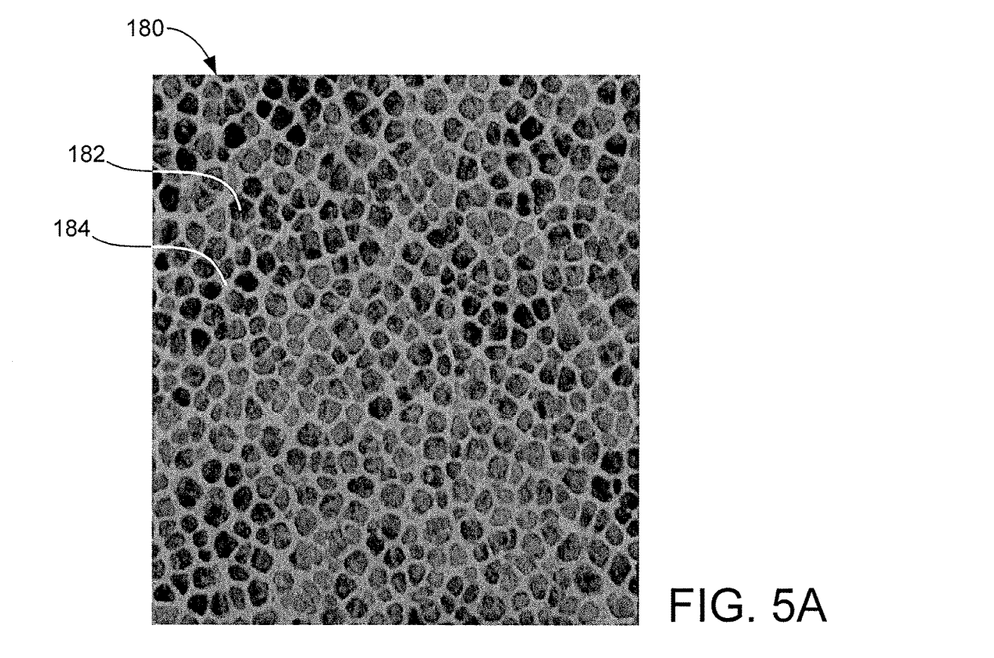
FIGS. 5A and 5B show portions of the rotatable magnetic recording discs of FIGS. 2-3.
Figure 5B:
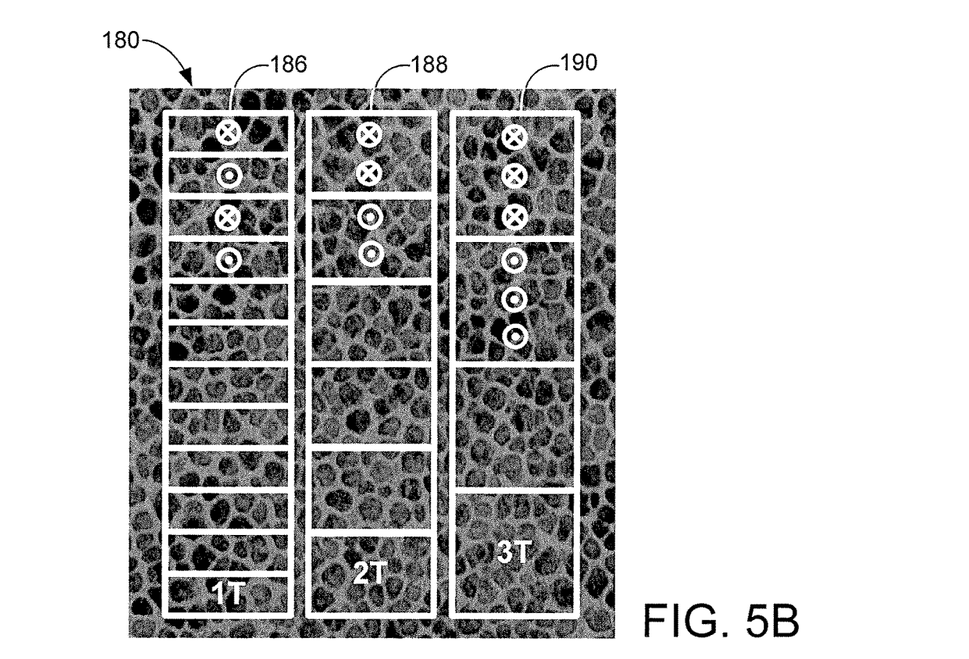

It is contemplated that a data security scheme is incorporated into the respective environments represented in FIGS. 3-4 to reduce the ability of attacking parties to gain unauthorized access to data stored by the various recording surfaces. To this end, FIGS. 5A-5B illustrate a photographic representation of an exemplary recording layer 180 from a selected recording medium 120. The recording layer 180 is characterized as a granular recording layer with a number of irregularly shaped magnetic grains 182 surrounded by non-magnetic material (boundaries) 184. The magnetic grains 182 can be formed of any number of suitable ferromagnetic materials and alloys, including Fe, Ni, Co, etc, alone or in combination with other elements. The non-magnetic material 184 substantially surrounds and isolates the respective grains 182, and can include various non-magnetic materials, alloys and/or oxides, such as Pt, B, Cr, etc.

Data are written to the recording layer 180 as an alternating magnetic pattern, or sequence of symbols with symbol boundaries at a defined channel clock rate T. The range of available symbols will vary depending on the run-length limited (RLL) encoding scheme employed by the R/W channel (FIG. 3). A typical sequence might be symbols from 1 T in length to 8 T in length. Other ranges can be used.

Each symbol boundary represents a change in magnetic recording direction, as depicted in FIG. 5B. A read sensor of the head senses such changes (flux transitions or magnetic reversals) and provides a corresponding pulse in a readback signal that corresponds, in time, to the position of the sensor with respect to the medium.

A first logical value, such as a 1, may be assigned to clock (T) intervals having a magnetic transition, and a different, second logical value, such as a 0, may be assigned to T intervals that have a magnetic transition in the other direction. In this way, a multi-bit sequence of logical 0 s and 1 s can be obtained from the media surface based on the direction of flux at each clock interval location.

A cell or bit is defined as that expanse of the recording layer that extends from one T boundary to the next. The recording layer 180 is contemplated as comprising a perpendicular magnetic recording layer so that the direction of magnetization is perpendicular to the recording surface (e.g., into and out of the page, as represented in FIG. 5B). Other arrangements can be used, including longitudinal recording, heat assisted magnetic recording (HAMR), etc.

Three separate, adjacent tracks are depicted in FIG. 5B. A first track is formed using a repeating pattern of 1 T symbols 186. In this first track, every bit has an alternating magnetic transition, so that the direction of magnetization of one 1 T symbol is the opposite of the direction of magnetization of its two adjacent neighbors.

A second track is formed using a repeating pattern of 2 T symbols 188. In this second track, the direction of magnetization changes every two bits. A third track is formed of 3 T symbols 190. In this third track, the direction of magnetization changes every three bits.

It has been found that providing a repeating written signature of symbols such as provided on the respective tracks in FIG. 5B can produce a unique signature that can be associated with the medium useful for various aspects of data security system protection schemes. The schemes can be useful both in data encryption for data stored elsewhere on the associated media recording surface, as well as in linking a particular recording surface to other circuitry associated with the media surface.

Figure 6:
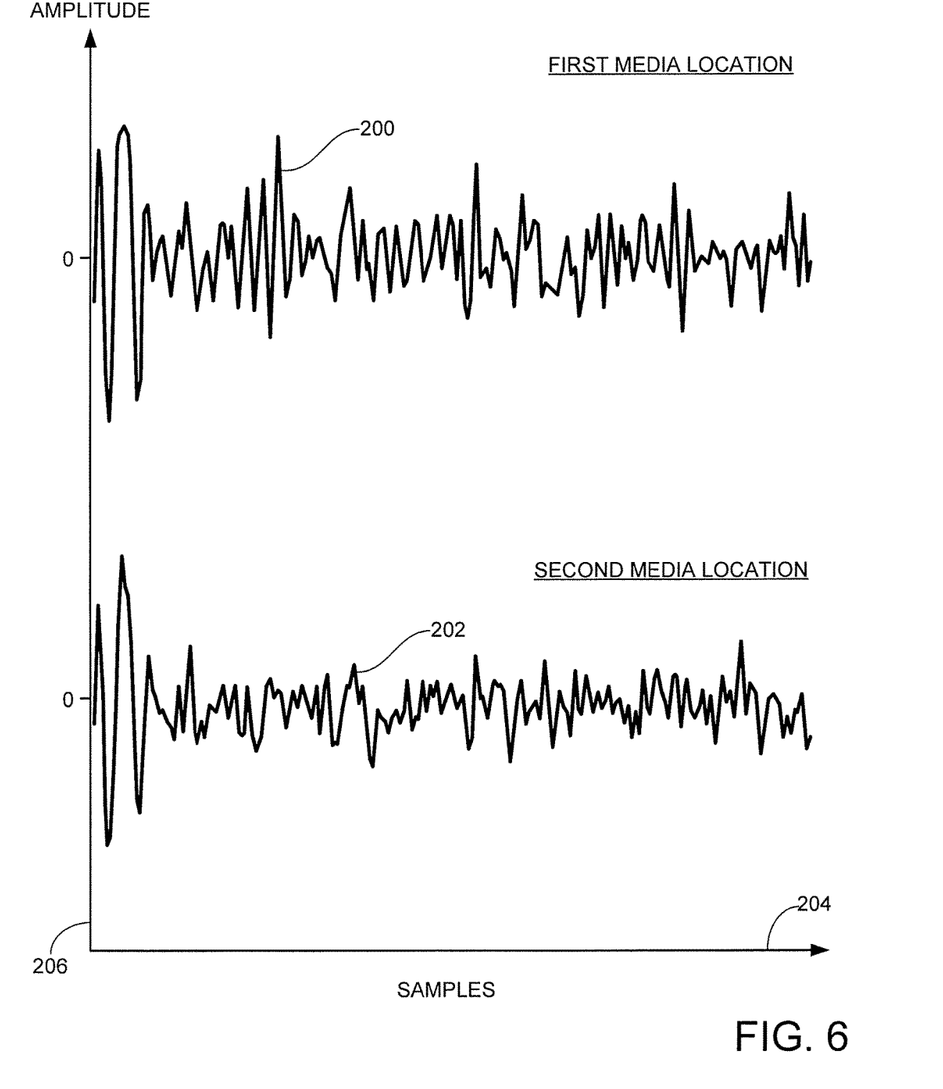
FIG. 6 is a graphical representation of readback response curves obtained from different media locations.

To this end, FIG. 6 shows graphical representations of two different readback response curves 200, 202 plotted against a common sample x-axis 204 and a common amplitude y-axis 206. The respective readback response curves show different characteristics of readback signals obtained from one or more read sensors detecting a common repeating pattern written to respective media locations. It is contemplated in FIG. 6 that the repeating pattern is a 1 T pattern, as depicted in FIG. 5B, but such is merely exemplary and is not required. The different media locations can be at different angular and radial locations on the same media surface, or can be provided on different media.

While both patterns would be understood as providing the read channel with the alternating digital sequence 10101010 . . . (e.g., a 1 T pattern), it can be seen that each readback signal has a different characteristic response. It has been found through empirical analysis that each of these respective locations will tend to provide this same or largely similar response each time the associated location is read. Some variations will occur due to a variety of factors including fly height, temperature, radial position of the sensor with respect to the centerline of the track, etc. Nevertheless, the various features of the respective curves 200, 202 will be largely repeatable each time the respective locations on the media are read. The sequence can be any suitable length; in some cases, an entire sector's worth of data may be specifically dedicated to the writing of a suitable pattern (e.g., a 1 T pattern, etc.) which is thereafter referenced as required. In other embodiments, existing features of the media, such as an existing data or servo pattern, are selected for use to generate the magnetic signature. It should be noted that once written, the pattern should be preserved and not disturbed or rewritten lest the unique signature be lost. Contrawise, as explained below, depending upon the way in which the unique signature is incorporated into the storage system, intentionally rewriting or overwriting the pattern may serve as an effective secure erasure methodology to prevent access to data stored on the associated media surface.

Figure 7:
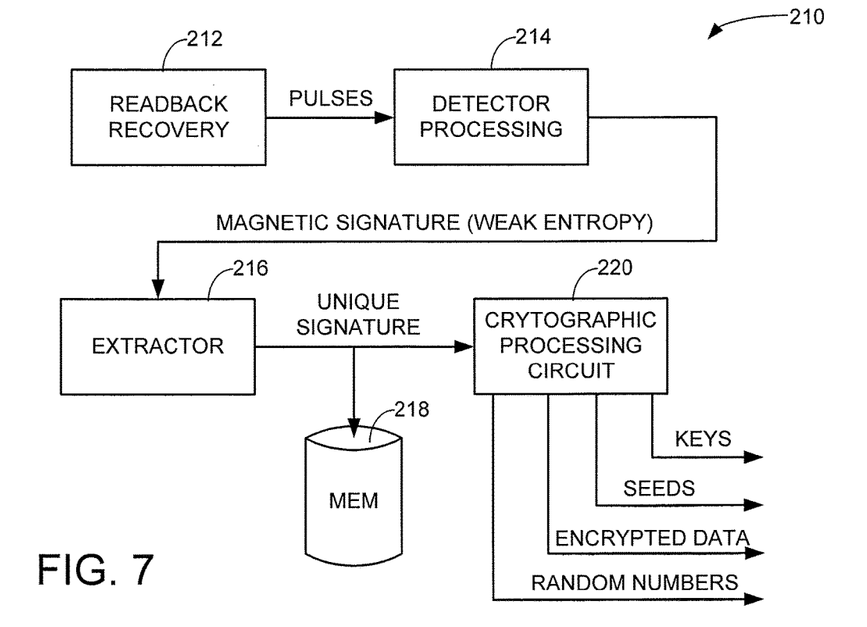
FIG. 7 is a functional block diagram of circuitry of the exemplary HDD of FIGS. 2-3 in accordance with some embodiments.

FIG. 7 is a functional block representation of a processing circuit 210 that may be used to process repeatable unique magnetic signatures as shown in FIG. 6 in a data security system. The circuitry depicted in FIG. 7 can be incorporated directly into a given data storage device such as the exemplary data storage device (HDD) 110 of FIG. 2, such as through functionality of the controller, read channel, etc. In other embodiments, aspects of the circuitry in FIG. 7 may be found in a host device such as a storage server, controller, etc.

A readback recovery block 212 transitions and conditions readback signals such as those in FIG. 6 as a sequence of pulses with analog components to a detector processing circuit 214. The detector processing circuit 214 applies suitable conditioning to the readback signal, such as but not limited to timing and amplitude thresholds, to provide a digitized sequence of the magnetic signature (having weak entropy) to an extractor 216, which in turn outputs a unique signature having strong entropy.

Generally speaking, entropy can be characterized as the amount of randomness in a given set of data. Data sets having relatively lower (or weak) entropy have an informational content that can be described through the use of a relatively small number of bits, while data sets having relatively higher (or strong) entropy have an informational content that can be described through the use of a relatively large number of bits. For example, a set of true random bits of length N would exhibit very strong entropy and require N bits to describe the set. A corresponding set of repeating bits of N length (e.g., the sequence 1111111 . . . ) would generally only require one or a few bits to describe the set (e.g., the value "1" which is used for all N bits in the sequence).

The sequences from FIG. 6 each represent a readback sequence (e.g., 010101 . . . ) with repeatable analog variations that can be expressed in terms of both timing transitions and pulse magnitudes. While such variation is different for the respective media locations, the variation is relatively small, and hence the respective signatures are each characterized as a source of weak entropy. While a 1 T pattern is shown, any suitable pattern can be provided including a random sequence of symbols. Hence, while a repeating pattern is contemplated in some embodiments, such is not required.

The extractor circuit 216 operates to extract, or produce, the unique signature as a multi-bit sequence having strong entropy. In some cases, the unique signature may approximate true random or pseudo-random numbers. Hence, the unique signature will have strong entropy. However, the sequence is repeatable such that each time the respective media location is read, the same unique signature will be generated. A variety of extraction methodologies are well known in the art and can be used as required. One form of extractor suitable in some embodiments is a cryptographic hash function (such as a SHA, or secure hash algorithm). Hardware circuits such as ring oscillators or other random number generator functions can also be used. In some cases, a selected seed value may be combined with the low entropy input from block 214 to generate the unique signature.

The cryptographic processing circuit 220 can utilize the unique signature in a variety of ways to generate values useful by the data security system. Such values can include encryption keys, seed values, encrypted data (e.g., ciphertext) and/or random numbers. Two such possible configurations for the circuit 220 are provided in FIGS. 8A and 8B, respectively.

Figure 8A:
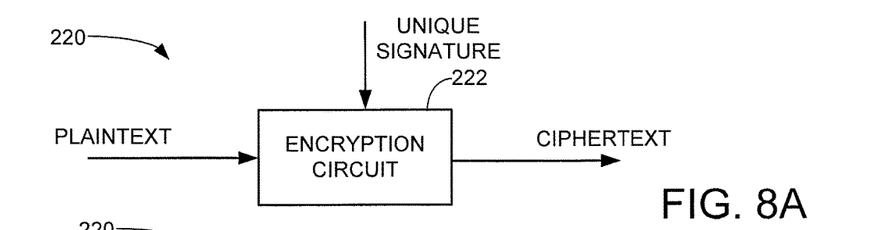
FIG. 8A shows an encryption circuit of the HDD in accordance with some embodiments.

In FIG. 8A, the multi-bit unique signature is utilized as an encryption key or other input to an encryption circuit 222 to encrypt input plaintext to form output ciphertext. The signature may be used as a seed value, an encryption key, etc. Any number of forms of encryption algorithms can be implemented by the encryption circuit 222.

Figure 8B:
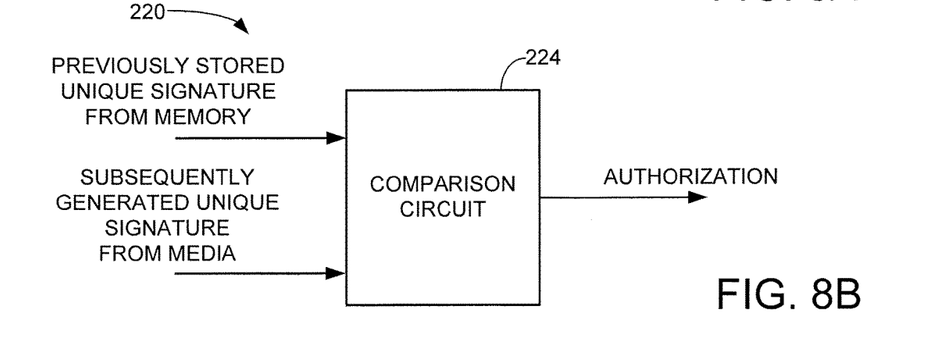
FIG. 8B shows a comparison circuit of the HDD in accordance with some embodiments.

In FIG. 8B, a comparison circuit 224 compares the previously generated (first) unique signature stored in the memory 218 of FIG. 7 with a subsequently generated (second) unique signature subsequently generated during a particular session. The comparison circuit performs a compare function to compare the respective first and second signatures. If sufficient similarity is found, an authorization signal can be issued to authorize a particular requested action, such as a host access command (e.g., a read or write operation to access data from the system). In some cases, a bit-by-bit comparison is made, such as using an exclusive-or (XOR) function. In other cases, a fuzzy comparison can be made to statistically match the respective signatures within a desired level of similarity in order to authorize the action.

Figure 9:
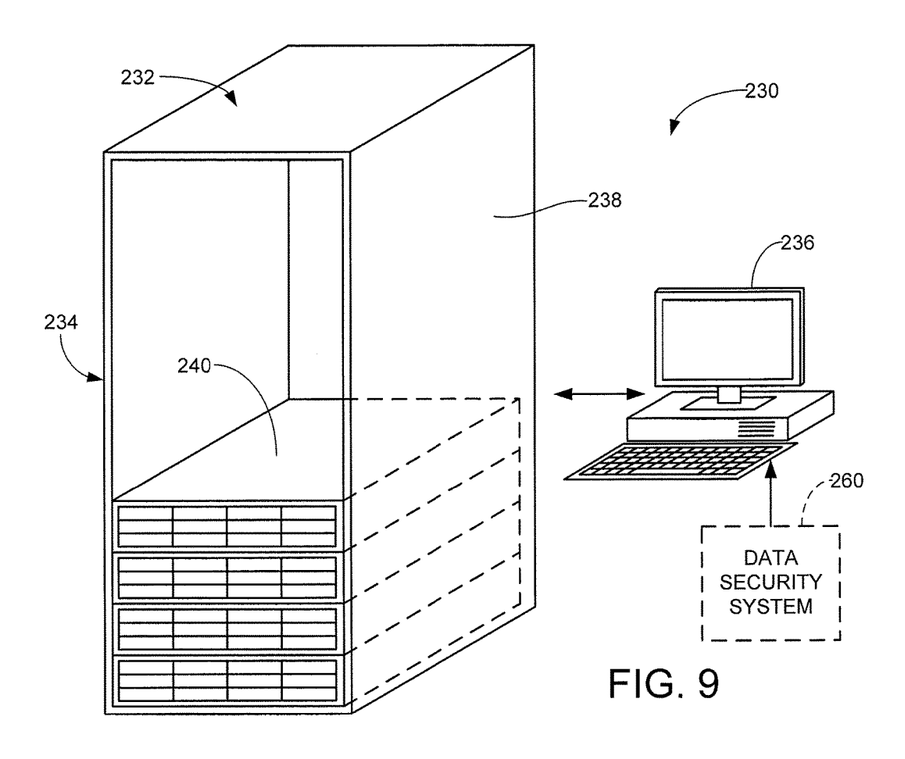
FIG. 9 shows a portion of a distributed data storage system that utilizes multi-device storage enclosures in accordance with some embodiments.
Figure 10:
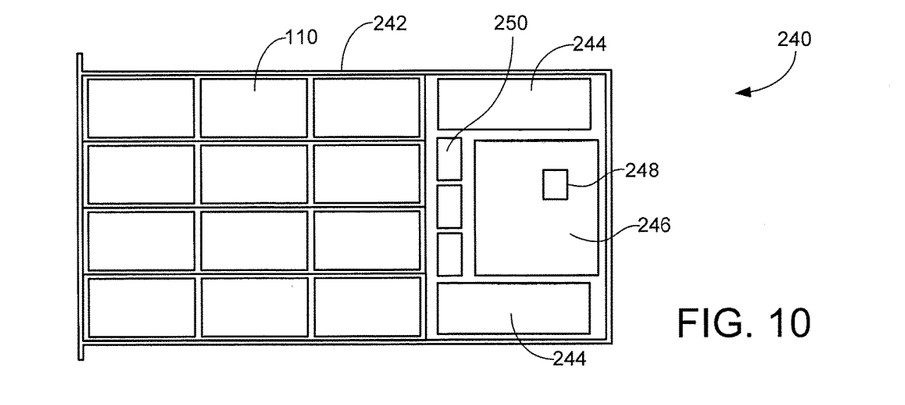
FIG. 10 is a top plan view representation of one of the storage enclosures from FIG. 10.

It will be recalled that a multi-device storage system 160 was discussed above in FIG. 4. Aspects of another, similar multi-device storage system 230 are illustrated in FIGS. 9-10. FIG. 9 shows a storage node 232 that includes a storage assembly 234 and a computer 236. The storage assembly 234 includes one or more server cabinets (racks) 238 with a plurality of modular storage enclosures 240.

The storage rack 238 is a 42 U server cabinet with 42 units (U) of storage, with each unit extending about 1.75 inches (in) of height. The width and length dimensions of the cabinet can vary but common values may be on the order of about 24 in.×36 in. Each storage enclosure 240 can have a height that is a multiple of the storage units, such as 2 U (3.5 in.), 3 U (5.25 in.), etc.

In some cases, storage controller functionality can be implemented via the local computer 236. In other cases, the storage controller functionality carried out by processing capabilities of one or more of the storage enclosures 240, and the computer 236 can be eliminated or used for other purposes such as local administrative personnel access.

An example configuration for a selected storage enclosure 240 is shown in FIG. 10. The enclosure 240 incorporates 36 (3×4×3) data storage devices 110. Other numbers of data storage devices can be incorporated into each enclosure. The data storage devices can take a variety of forms, including hard disc drives (HDDs), solid-state drives (SSDs), hybrid drives (Solid State Hybrid Drives, SDHDs), etc. It is contemplated that at least one of the storage devices within the storage enclosure 240 utilizes at least one magnetic recording surface from which a unique signature can be derived as discussed above.

Each of the data storage devices 110 thus includes associated storage media to provide main memory storage capacity for the system 230. Individual data storage capacities may be on the order of about 8 terabytes, TB ($8 \times 10^{12}$ bytes), per device, or some other value. Devices of different capacities, and/or different types, can be used in the same node and/or the same enclosure. Each storage node 232 can provide the system 230 with several petabytes, PB ($10^{15}$ bytes) of available storage or more, and the overall storage capability of the system 100 can be several exabytes, EB ($10^{18}$ bytes) or more.

The storage enclosures 240 include a rigid, rectilinear housing 242 to house the storage devices 110 as well as additional components such as power supplies 244, a control board 246 with programmable controller circuit (CPU) 248, fans 250, etc. to enable the data storage devices 110 to store and retrieve user data objects.

Referring again to FIG. 9, a data security system 260 is incorporated into the storage system 230. The data security system may be implemented using various hardware and software components and executed by various processors and elements, including in the individual storage devices 110, the storage enclosures 240 and/or the local computer 236.

Aspects of the exemplary data security system 260 include mechanisms that utilize the unique signature from FIG. 7 to ensure that a given storage device 110 is physically mated with another component in the system. The various mated pairings can be hierarchical and utilize various components, such as ensuring a given medium is mated to the appropriate external PCBA (see 132, FIG. 2), an adjacent data storage device 110, a given controller board (see 246, FIG. 10), another storage enclosure 240, the local computer 236, etc. Other configurations can be used as desired as well.

Figure 11:
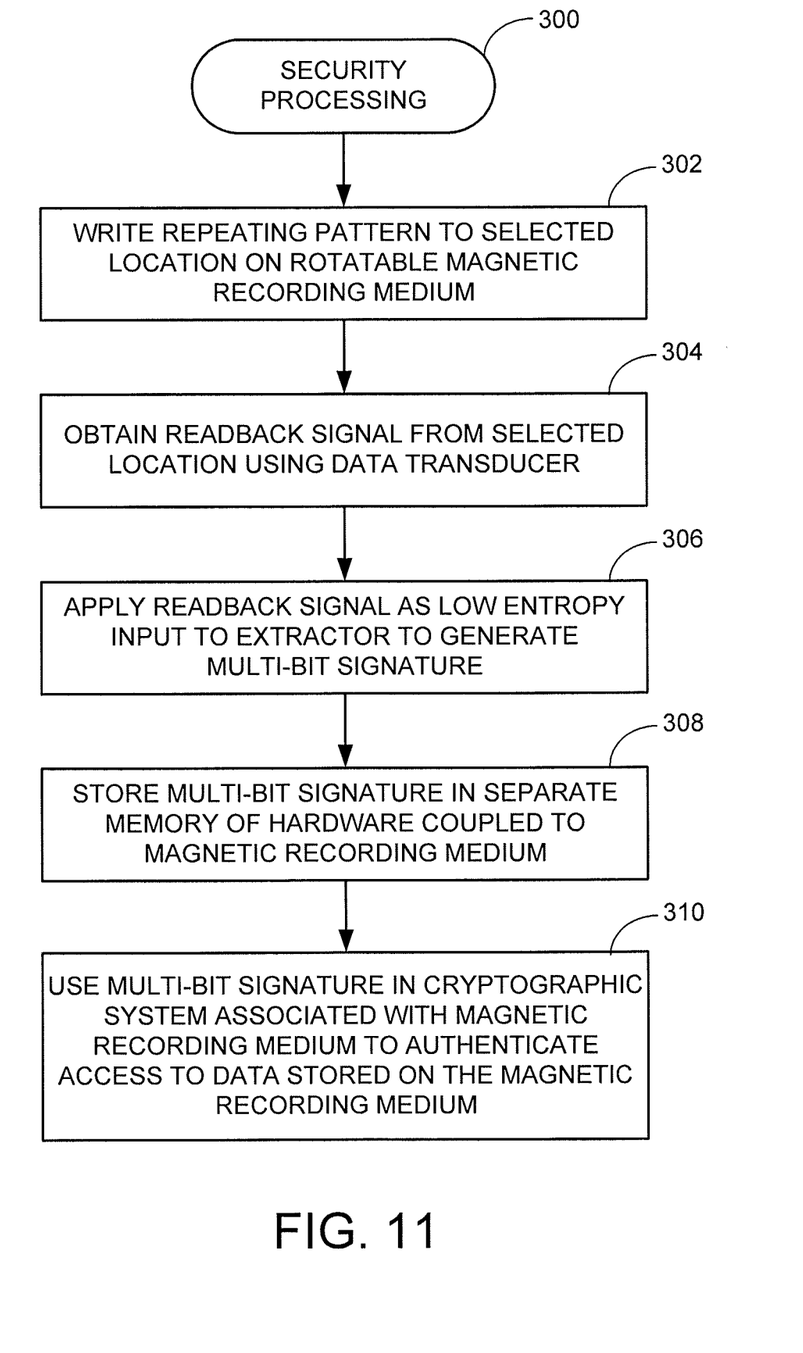
FIG. 11 is a flow chart for a security processing routine illustrative of steps carried out in accordance with some embodiments of the present disclosure.

FIG. 11 shows a flow chart for a security processing routine 300 illustrative of steps that may be carried out by the data security system 260 of FIG. 9 in accordance with some embodiments. The various steps may represent programming utilized by one or more processors using programming in associated memory. In some cases, different processors may carry out different aspects of the routine.

The process begins at step 302 in which a repeating multi-bit pattern is written a selected location on a rotatable magnetic recording medium, such as the media 120 in FIG. 2. In some embodiments, a 1 T pattern may be written (see FIGS. 5B and 6); in other embodiments, other patterns may be written. The pattern is written by selectively magnetizing a recording layer (such as 180) of the medium along an extent of a given track. The data pattern may be specially configured in a separate guard location not normally accessed by the disc drive; in other embodiments, an existing pattern otherwise used by the storage device 110 for other purposes, such as a portion of a given servo sector or control field (such as an automatic gain control, AGC field having a 2 T pattern, etc.) may be selected. Any suitable length can be used provided sufficient entropy is generated.

The signature is next read by a transducer to obtain a readback signal from the selected location using a data transducer, step 304. The readback signal will be largely repeatable each time the location is read.

The readback signal, also characterized as a magnetic signature, is utilized as a low entropy source and is fed to an extractor circuit (see e.g., 216, FIG. 7) to generate a unique high entropy signature as a multi-bit sequence. As noted above, the multi-bit sequence is nominally repeatable each time that the magnetic location is read.

The extracted unique signature is next stored in a local memory device at step 308. The local memory is not the same magnetic recording disc from which the signature was obtained. Instead, the local memory is some other memory external to the HDA housing the magnetic disc. In one embodiment, the signature may be stored on the external PCBA 132. In another embodiment, the signature may be stored in the controller board 246. In still another embodiment, the signature may be stored in the local computer 236. As desired, the signature may be separately stored in each of these or other locations to provide multiple levels of verification of physical connection of the respective components.

The unique signature is thereafter used at step 310 in a cryptographic system that is associated with the magnetic recording medium and used to authenticate access to data stored on the medium. As discussed above, this may include using the device to generate various other outputs such as encrypted data, encryption keys, seed values, random numbers, etc. Additionally or alternatively, the signature may be compared to a subsequently generated signature to allow system authorization based on continued physical connection of the associated components in which the local copy of the unique signature.

The various embodiments presented herein provide a number of benefits. By extracting a unique and repeatable magnetic signature from a rotatable magnetic recording medium, the magnetic signature may be used as a source of weak entropy to extract a unique multi-bit digital signature with strong entropy. The unique signature may thereafter be stored in a separate memory and used in various cryptographic processes including one in which a physical hardware connection between the rotatable recording medium and the separate memory is ensured prior to access authorization involving data stored on the recording medium.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method comprising:
   writing an alternating pattern as a sequence of symbols at a selected clock rate to a magnetic recording medium comprising a magnetic recording layer with a sequence of irregularly shaped magnetic grains surrounded by non-magnetic material;
   generating a repeatable magnetic signature by reading the alternating pattern from the medium, the repeatable magnetic signature having weak entropy at boundaries of the symbols responsive to an arrangement of the magnetic grains at each symbol boundary;
   extracting a first multi-bit digital sequence having strong entropy by applying a cryptographic hash function to the repeatable magnetic signature;
   storing the first multi-bit digital sequence in a separate memory coupled to the medium; and
   authenticating access to data stored on the medium responsive to the first multi-bit digital sequence stored in the separate memory by subsequently repeating the generating and extracting steps to generate a second multi-bit digital signature, comparing the second multi-bit digital signature to the first multi-bit digital signature stored in the separate memory, and authorizing a data transfer operation between a host device and the medium responsive to a match between the first and second multi-bit digital signatures, wherein the authenticating access comprises using the first multi-bit digital sequence in the separate memory as an input to a cryptographic process, and wherein the cryptographic process comprises using a processing circuit to apply an encryption algorithm to encrypt input plaintext data to form encrypted ciphertext data using the first multi-bit digital sequence in the separate memory as an input encryption key for the encryption algorithm.

2. The method of claim 1, wherein the magnetic recording medium forms a portion of a first component in a data storage system, the separate memory forms a portion of a different, second component of the data storage system, wherein an electrical connector is provided to operably couple the first component to the second component, and the authorizing of the data transfer operation indicates that the first component is physically interconnected to the second component using the electrical connector.

3. The method of claim 1, further comprising using a comparison circuit that compares the first and second multi-bit digital sequences.

4. The method of claim 1, wherein the pattern comprises a 1 T repeating pattern.

5. The method of claim 1, wherein the pattern comprises a random pattern.

6. The method of claim 1, wherein the magnetic recording medium forms a portion of a hard disc drive (HDD) and the separate memory is disposed on a control board connected to the hard disc drive through at least one electrical connector.

7. An apparatus comprising:
   a data storage device comprising a housing which encloses a rotatable magnetic recording medium adjacent a moveable read/write transducer, the magnetic recording medium comprising a magnetic recording layer having a sequence of irregularly shaped magnetic grains surrounded by non-magnetic material, the data storage device further comprising a control circuit which directs the transducer to write an alternating magnetic pattern to a selected location of the magnetic recording layer as a sequence of symbols at a selected clock rate with each symbol boundary providing a change in magnetic recording direction, and to subsequently read the alternating pattern to form a repeatable magnetic signature having relatively weak entropy at boundaries of the symbols in response to an arrangement of the magnetic grains at each symbol boundary;
   an extraction circuit configured to apply a first cryptographic function to the repeatable magnetic signature to extract a repeatable first multi-bit digital sequence having relatively strong entropy; and
   a control circuit physically connected to the data storage device configured to store the first multi-bit digital signature in a separate memory, and configured to subsequently authenticate access to data stored on the medium by using the first multi-bit digital signature as an input to a second cryptographic function to transform input plaintext user data to cipher text, to direct the transducer to store the cipher text to the rotatable data recording medium, to direct the transducer to read the alternating pattern to form a second repeatable magnetic signature identical to the repeatable magnetic signature, to direct the extraction circuit to apply the first cryptographic function to the second repeatable magnetic signature to extract a repeatable second multi-bit digital sequence, and to use the extracted repeatable second multi-bit digital sequence to convert the cipher text back to the input plaintext user data using the second cryptographic function.

8. The apparatus of claim 7, wherein the data storage device is characterized as a hard disc drive (HDD) and the extraction circuit and the control circuit are mounted on an external printed circuit board assembly (PCBA) affixed to an outside surface of the housing.

9. The apparatus of claim 7, wherein the data storage device is incorporated into a multi-device array to provide a consolidated memory space, and the extraction circuit and the control circuit are respectively connected to the data storage device in a server control circuit configured to direct data transfer operations between the multi-device array and a remote host device across a network.

10. The apparatus of claim 7, wherein the pattern comprises a 1 T repeating pattern.

11. The apparatus of claim 7, wherein the pattern comprises a random pattern.

12. The apparatus of claim 7, wherein the extraction circuit is incorporated into the data storage device.

13. The apparatus of claim 7, wherein the magnetic recording medium is characterized as a perpendicular magnetic recording medium.

* * * * *